United States Patent [19]
Toyoda

[11] Patent Number: 5,069,300
[45] Date of Patent: Dec. 3, 1991

[54] CALIBRATION SYSTEM FOR A COMBINATION WEIGHING APPARATUS

[75] Inventor: Yoshiharu Toyoda, Akashi, Japan

[73] Assignee: Yamato Scale Company, Limited, Akashi, Japan

[21] Appl. No.: 511,244

[22] Filed: Apr. 19, 1990

[30] Foreign Application Priority Data

Apr. 19, 1989 [JP] Japan .................................. 1-99800

[51] Int. Cl.$^5$ ...................... G01G 13/16; G01G 23/14
[52] U.S. Cl. .................................. 177/25.18; 177/164
[58] Field of Search ...................... 177/25.18, 164, 165

[56] References Cited

U.S. PATENT DOCUMENTS

| | | | |
|---|---|---|---|
| 4,344,492 | 8/1982 | Hirano | 177/25 |
| 4,465,149 | 8/1984 | Kawashima et al. | 177/165 X |
| 4,534,430 | 8/1985 | Steel | |
| 4,583,605 | 4/1986 | Hirano | 177/50 |
| 4,661,920 | 4/1987 | Haze | 364/571 |
| 4,694,920 | 9/1987 | Naito et al. | 177/25 |

FOREIGN PATENT DOCUMENTS 2070362 3/1981 United Kingdom .
0275885 7/1988 United Kingdom .

*Primary Examiner*—George H. Miller, Jr.
*Attorney, Agent, or Firm*—Senniger, Powers, Leavitt & Roedel

[57] ABSTRACT

A zero-point calibration system in a combination weighing apparatus which has buckets storing masses subject to selection in combination processing and including only weighing buckets, only auxiliary buckets or both of them, the system comprising: means for detecting a timing at which a number of buckets subject to selection in the next cycle becomes definite; another means calculating the number of buckets from which the masses are discharged in the next cycle, by computing possible combinations of selected buckets, based on the timing detected by the detecting means; a further means effecting a predictive calculation of a number of buckets from which the masses have been discharged at the latest cycle and which are subsequently subject to selection in the cycle after the next cycle, based on the number of buckets calculated by the combination calculating means; and a still further means changing states of buckets from their inactive states for blank weighing in zero-point calibration into their operative states for the actual weighing of masses subject to selection in the cycle after the next cycle of combination processing, whereby the number of buckets available to said cycle after the next cycle is increased if the further number of buckets predictively calculated is less than a predetermined number, so as to maintain an accuracy in combination at a high level.

5 Claims, 16 Drawing Sheets

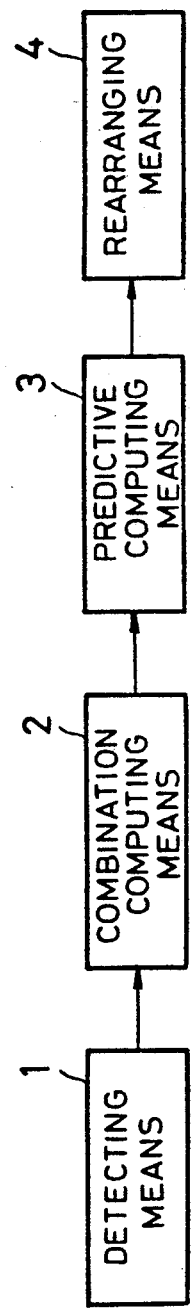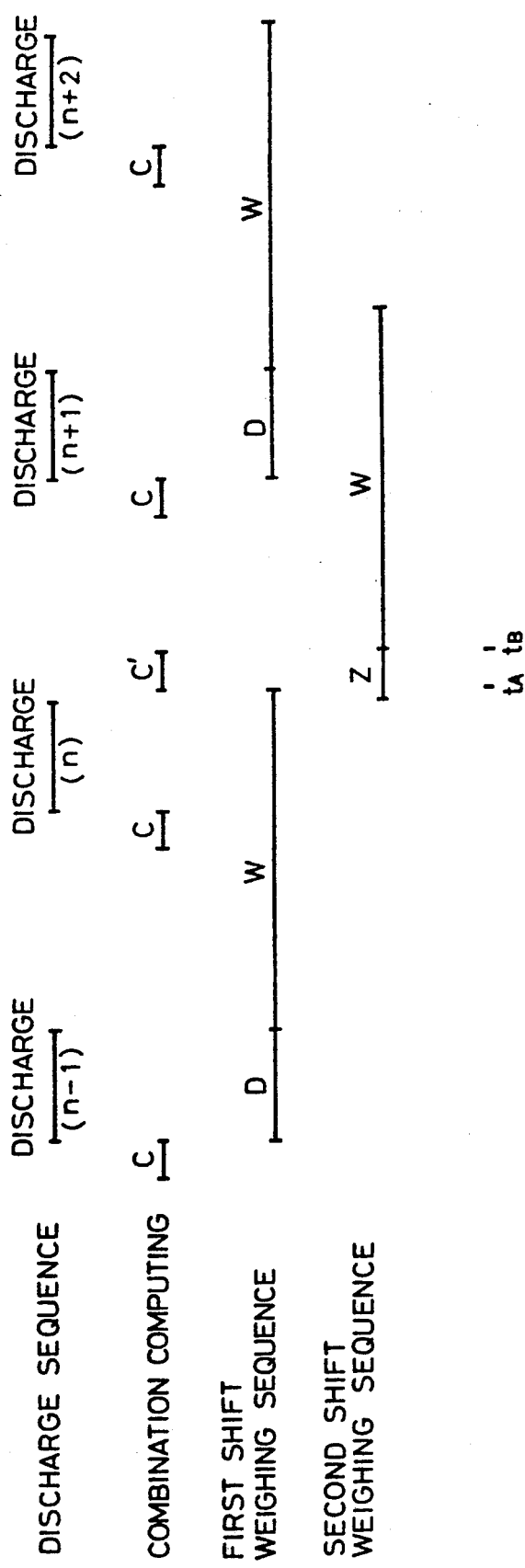

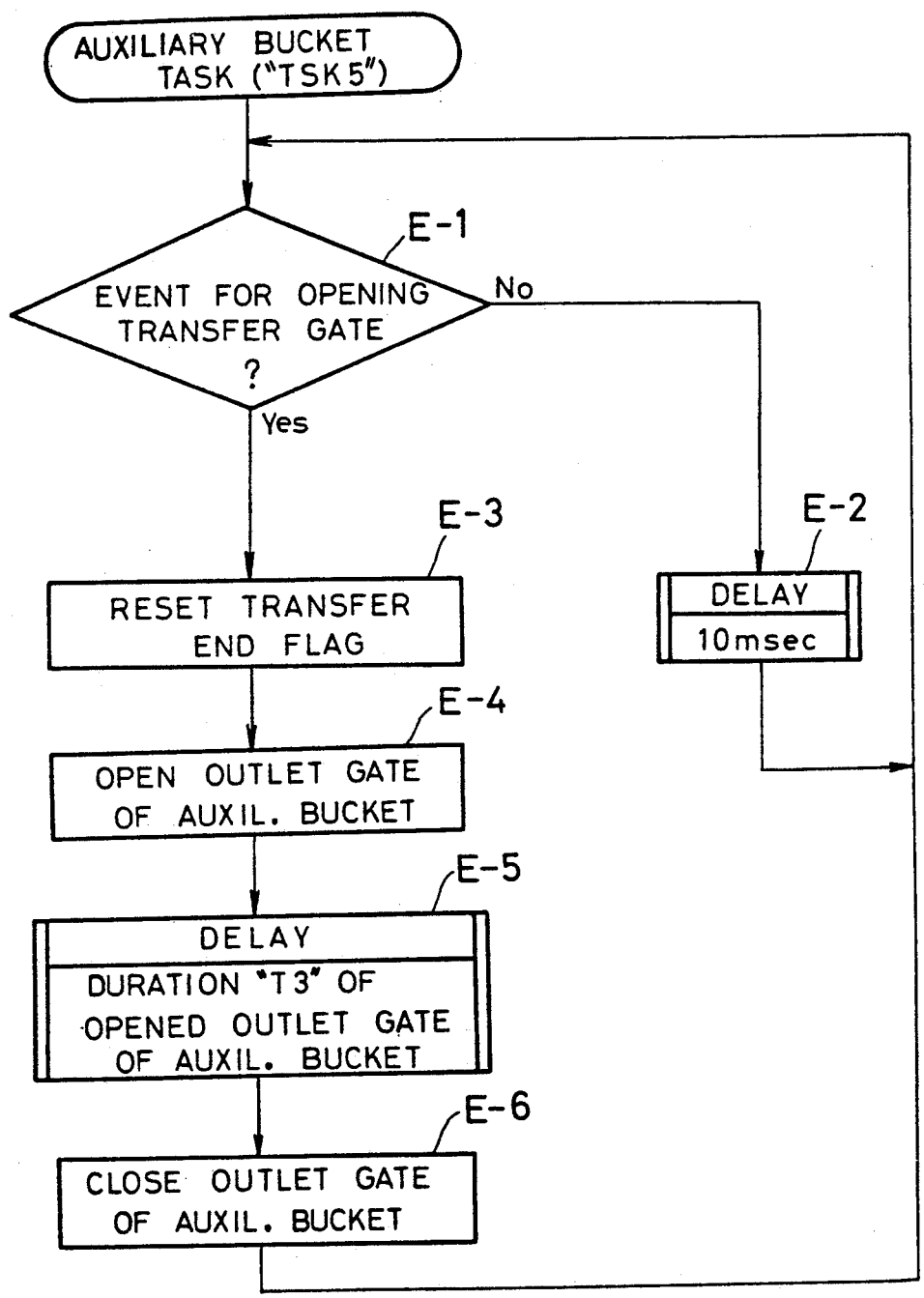

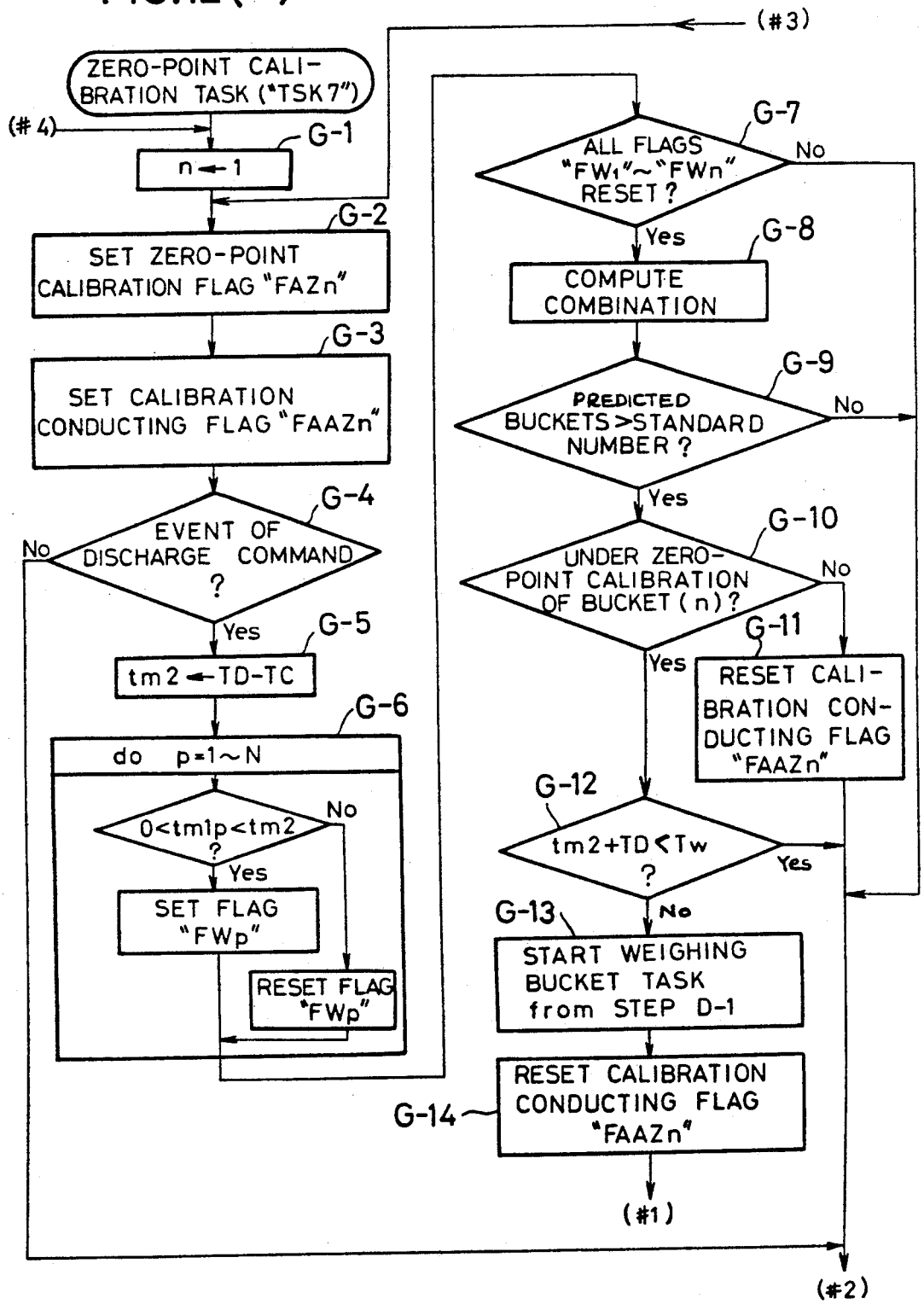

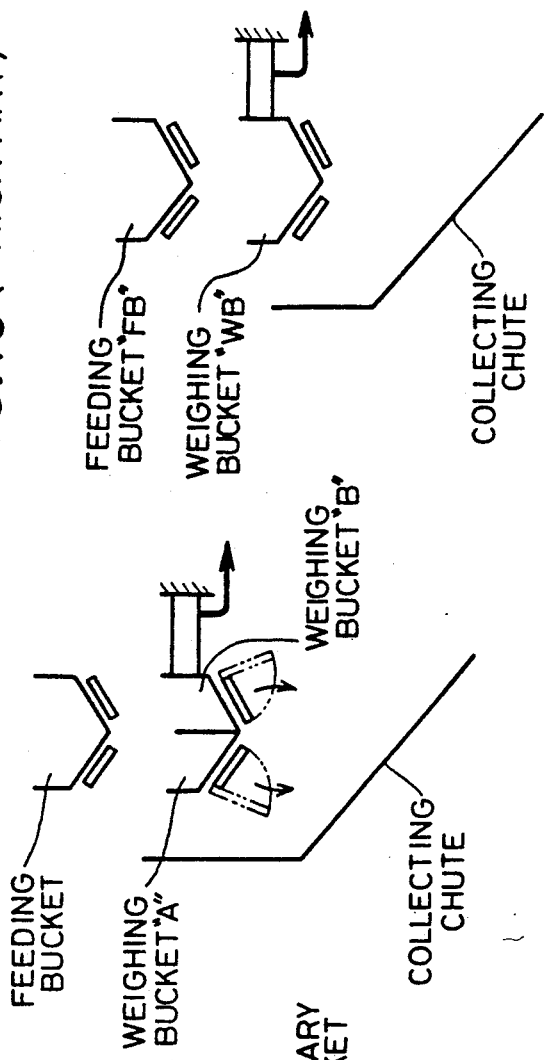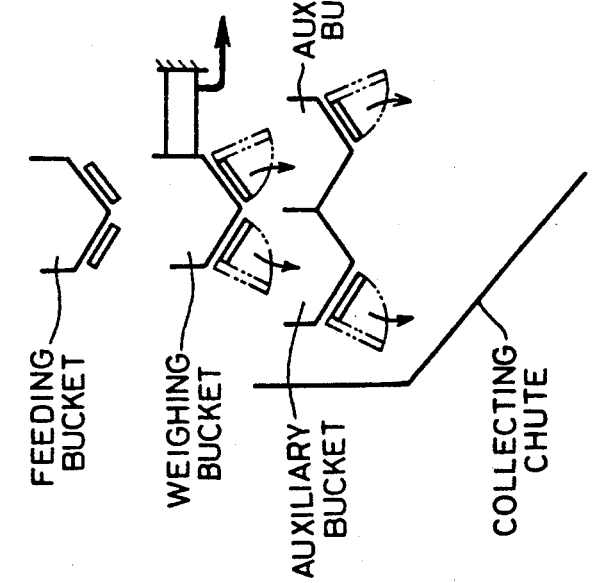

CALIBRATION SYSTEM FOR A COMBINATION WEIGHING APPARATUS

BACKGROUND OF THE INVENTION

The present invention relates to a calibration system for a combination weighing apparatus, and more particularly relates to a calibration system adapted to calibrate a zero point of weighing buckets included in a combination weighing apparatus wherein the weighing buckets are weighed at their empty state but during their normal operation period in order to improve accuracy and efficiency in combination processing.

There is known a calibration system in a combination weighing apparatus which comprises a plurality of sets of buckets, each set being composed of one feeding bucket "FB" and one weighing bucket "WB" as is shown in FIG. 16 wherein contents of the weighing buckets are directly discharged into a collecting chute. The known calibration system in such a basic set of buckets is illustrated on a time chart shown in FIG. 17. The time chart shows calibration of zero point of the weighing buckets included the basic set of buckets on the so-called "double-shift operation" which is composed of a first shift or mode of weighing sequence and a second shift or mode of weighing sequence. The reference symbol "C" on the horizontal bars in FIG. 17 denotes a period of time needed to calculate possible combinations, each combination including weighed masses of material or the weighing buckets "WB" containing same. The masses are of given weights and are to be subject to selection. The other reference symbol "D" denotes a period of time required to discharge the mass in selected bucket into the collecting chute. The further reference symbol "W" indicates a further period of time for the "actual" weighing by said weighing bucket "WB", the "actual" weighing being done to determine the weight of said mass. The still further reference symbol "Z" indicates a still further period of time for the "blank" weighing of an empty weighing bucket, the "blank" weighing being done to calibrate the zero point of said weighing bucket.

A group "Sa" of the horizontal bars in FIG. 17 indicate a case wherein no calibration of zero point is conducted during the second shift of weighing sequence. The weighing of a succeeding mass begins as shown by "W" immediately after a preceding mass has been discharged as shown by "D", in this mode. Another group "Sb" of the horizontal bars in FIG. 17 indicate another case wherein calibration of zero point is conducted at regular intervals of time or every time when a predetermined number of masses have been discharged from the weighing bucket "WB", during the second shift of weighing sequence. In the example illustrated in FIG. 17, the feeding bucket "FB" does not supply the weighing bucket "WB" with the succeeding mass after the latter bucket has discharged an n-th mass as shown by the symbol "D". Thus, "blank" weighing of said weighing bucket "WB" is carried out as shown by "Z" immediately after finish of the discharge. A weight signal obtained by such a blank weighing will be transmitted as a tare weight of said weighing bucket to a control system described later, after the intensity of said signal has become stable.

The "actual" weighing "W" will be reopened by the weighing bucket "WB" after the "blank" weighing "Z" has completed, receiving the next mass from the feeding bucket "FB". It is, however, impossible for the weighing bucket to finish the reopened "actual" weighing of the succeeding mass before the calculation of combination for (n+2)th discharge cycle starts. Thus, the next mass cannot be made subject to said calculation for the (n+2)th discharge. In other words, such a considerably long period of time is necessary for the "blank" weighing "Z" due to the period needed to stabilize the signal of tare weight which is utilized to accurately calibrate the zero point of the weighing bucket "WB". Therefore, the "blank" weighing during a normal operation period of the weighing bucket "WB" will make it impossible to obtain a well stabilized weight signal of the next mass before the calculation of combination of masses for the next discharge will start.

It will be apparent that the described known system for calibration of zero point is disadvantageous because the calibration is conducted at regular time intervals or for every predetermined number of discharges. This reduces the number of weighing buckets available to the selection in the combination processing, thereby affecting the accuracy and efficiency in combination of the masses contained in said weighing buckets. In the combination weighing apparatus which comprises the basic sets of buckets, the effective number of available buckets depends upon the number of weighing buckets "WB" from which the preceding masses have been discharged in the aforementioned "double-shift" operation.

An example of the known apparatuses is now described which is composed of fourteen (14) sets of buckets, each set comprising one feeding bucket "FB" and one weighing bucket "WB", in order to more fully describe the effective number of the available buckets.

In an assumptive case wherein four (4) weighing buckets "WB" have discharged their contents at $(n+1)$th discharge cycle, the number of available weighing buckets will be ten $(10) (=14-4)$ for the next $(n+2)$th discharge cycle. It is possible that three (3), four (4) or five (5) weighing buckets "WB" have to discharge the weighed masses contained therein even if an average number of available weighing buckets "WB" were set to be four (4) for each discharge cycle. This variation is caused by unevenness in the weight of masses in the weighing buckets. Thus, probabilities are about 20%, 60% and 20% respectively for the cases of discharge from three, from four and from five weighing buckets.

The above-mentioned assumptive case wherein ten (10) buckets are available for the $(n+2)$th discharge provides two hundred and ten $(210) (={}_{10}C_4)$ combinations of the weighing buckets "WB". The number of such combinations will be reduced to one hundred and twenty-six (126) if five (5) weighing buckets have discharged at the preceding $(n+1)$th cycle so that the number of available buckets is nine (9) for the $(n+2)$th cycle. Said number of combinations will be further decreased to, for instance, seventy$(70) (={}_8C_4)$ if one bucket undergoes zero-point calibration to be inactive at the next cycle. Such a decrease in the number of available weighing buckets will seriously lower the accuracy of combination.

It is to be noted that the zero-point calibration is carried out to compensate any drift in zero-points of sensors or amplifiers, which drift may be caused by fluctuation of ambient temperature or by adhesion of the weighed material to walls of the weighing buckets "WB". Generally speaking, such zero-point calibration is effected for instance at intervals of ten (10) minutes or for every thousand (1000) discharges. Therefore, said calibration is not a matter of urgency or emergency.

SUMMARY OF THE INVENTION

It is therefore an object of the invention to provide a combination weighing apparatus with a calibration system which is free from the aforedescribed problems.

In accordance with this invention, the calibration system in the combination weighing apparatus comprises, as is schematically shown in FIG. 1, the following features: (a) a detecting means (1) for detecting a timing at which a number of buckets becomes definite, the weighing buckets storing masses subject to selection in the next cycle of combination processing; (b) a combination computing means (2) for calculating the number of buckets from which the masses are discharged in the next cycle of combination processing, by computing possible combinations of the buckets to be selected in the selection, based on the timing detected by the detecting means (1); (c) a predictive computing means (3) for effecting a predictive calculation of a further number of the buckets from which the masses have been discharged at the latest cycle of combination processing and which will subsequently be subject to the selection in the cycle after the next cycle of combination processing, based on the number of buckets calculated by the combination computing means (2); and (d) a rearranging means (4) for changing states of one or more buckets from their inactive states for blank weighing in zero-point calibration into their operative states for the actual weighing of the masses which are subject to the selection in the cycle after the next cycle of combination processing, whereby the number of the weighing buckets available to said cycle after the next cycle of combination processing is increased in a case wherein the further number predictively calculated by the predictive computing means is less than a predetermined number.

These features will function in a weighing apparatus comprising the basic sets of buckets, in such a manner as illustrated on a time chart in FIG. 2.

The detecting means (1) detects the timing "$t_4$" at which the number of weighing buckets storing masses subject to selection in the succeeding combination processing becomes definite, the masses being subject to be discharged at the (n+1)th cycle. The combination computing means (2) begins calculation "C'" of the combination and number of weighing buckets subject to selection in said succeeding combination processing, at the timing $t_4$ immediately after the latest n-th cycle has finished. The predictive computing means (3) utilizes the thus calculated number of weighing buckets which will have discharged their contents at the n+1 cycle so as to predict the further number of said weighing buckets which are available in the succeeding (n+2)th cycle. If this further number is less than a predetermined number, then the rearranging means (4) interrupts the blank weighing "Z" at a timing $t_B$ so as to postpone the zero-point calibration of the weighing bucket.

It will now be apparent that in the invention said zero-point calibration is deferred in a case wherein the effective number of available weighing buckets for the succeeding (n+2)th cycle is below a predetermined standard number, whereby the accuracy in total weight of the combined or merged masses is maintained sufficiently high.

BRIEF DESCRIPTION OF THE DRAWINGS

The present invention will become more apparent from the following description made referring to the drawings, in which:

FIG. 1 is a schematic diagram showing the primary features of a calibration system for a combination weighing apparatus;

FIG. 2 is a time chart schematically illustrating the functions of the calibration system applied to basic sets of buckets in the combination weighing apparatus;

FIGS. 3 to 13 illustrate in detail one embodiment of the calibration system of this invention, wherein;

FIG. 3 is a schematic view of a combination weighing apparatus in outline;

FIG. 4 is a block diagram of a control mechanism employed in the apparatus;

FIG. 5 illustrates the software used to control the apparatus;

FIGS. 6 and 13 are time charts showing the operation of the software;

FIGS. 7 to 12b are flowcharts of programs or tasks "TSK2" to "TSK7" executed by a microcomputer incorporated in the control mechanism; and FIGS. 14a to 15 illustrate a second embodiment, wherein; FIGS. 14a and 14b show different sets of buckets;

FIG. 15 is a time chart corresponding to the time chart in FIG. 13 but modified for a case in which each set of buckets comprises two weighing buckets;

FIGS. 16 and 17 illustrate prior art, wherein;

FIG. 16 shows a basic set of buckets; and

FIG. 17 is a time chart illustrating the functions of a prior art control mechanism.

DETAILED DESCRIPTION OF THE PREFERRED EMBODIMENTS

In a first embodiment of this invention, a zero-point calibration system in a combination weighing apparatus is adapted to the so-called "double-shift" operation which includes a first weighing sequence and a second weighing sequence.

Figure 3:
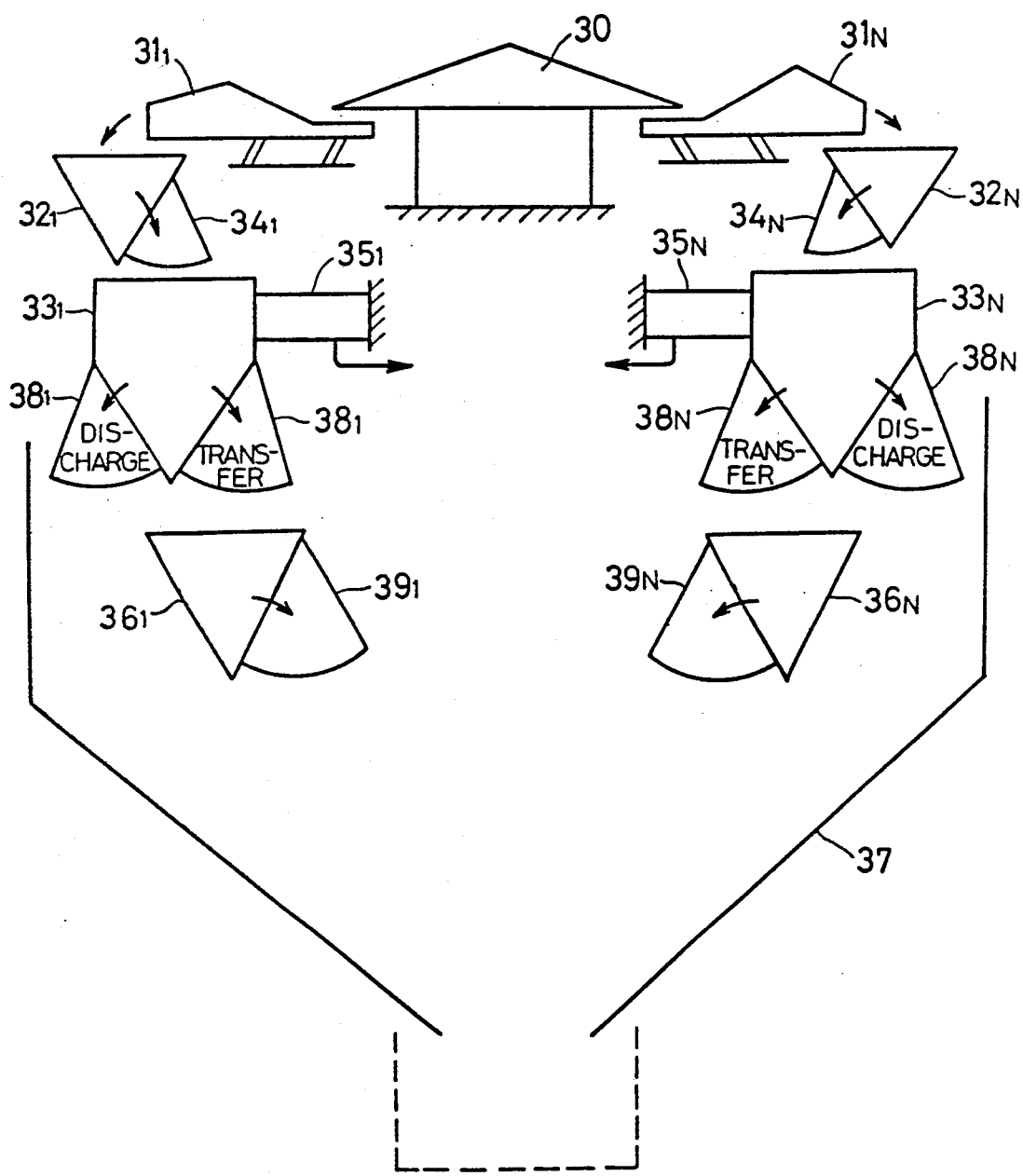

Referring to FIG. 3 which illustrates a mechanical structure of the weighing apparatus, there are shown a distributing device 30 and "N" sets of feeders $31_1$ to $31_N$ which are disposed around the device and along a periphery thereof. There are feeding buckets $32_1$ to $32_N$ respectively disposed under the corresponding feeders $31_1$ to $31_N$. Lumps, clods or masses of material to be weighed are delivered to the feeding buckets $32_1$ to $32_N$, through the corresponding feeders $31_1$ to $31_N$, respectively.

Weighing buckets $33_1$ to $33_N$ are respectively disposed below the corresponding feeders $31_1$ to $31_N$. Said masses which have been delivered to the feeding buckets are then fed to the weighing buckets $33_1$ to $33_N$, through corresponding outlet gates $34_1$ to $34_N$ which are provided on the feeding buckets $32_1$ to $32_N$. The weighing buckets $33_1$ to $33_N$ are each provided with one of measuring devices $35_1$ to $35_N$ which comprise load cells or the like adapted to weigh said masses fed to said weighing buckets $33_1$ to $33_N$ Auxiliary buckets $36_1$ to $36_N$ are respectively disposed under their corresponding weighing buckets, in a one-to-one relation. A collecting chute 37 is located below all of the weighing buckets and all of the auxiliary buckets. The masses which have been weighed in the weighing buckets $33_1$ to $33_N$ are either transferred to the auxiliary buckets $36_1$ to 36N or discharged directly into the collecting chute 37, according to the states of a pair of outlet gates $38_1$ to $38_N$ comprising an outlet gate and a transfer gate provided on each weighing bucket. On the other hand, the masses which have been stored temporarily in the auxiliary buckets $36_1$ to $36_N$ will also be discharged into said collecting chute 37 when outlet gates $39_1$ to $39_N$ of said auxiliary buckets are opened.

A packing device (not shown) also is provided under the collecting chute 37 so as to pack the masses collected in said chute and discharged therethrough.

Figure 4:
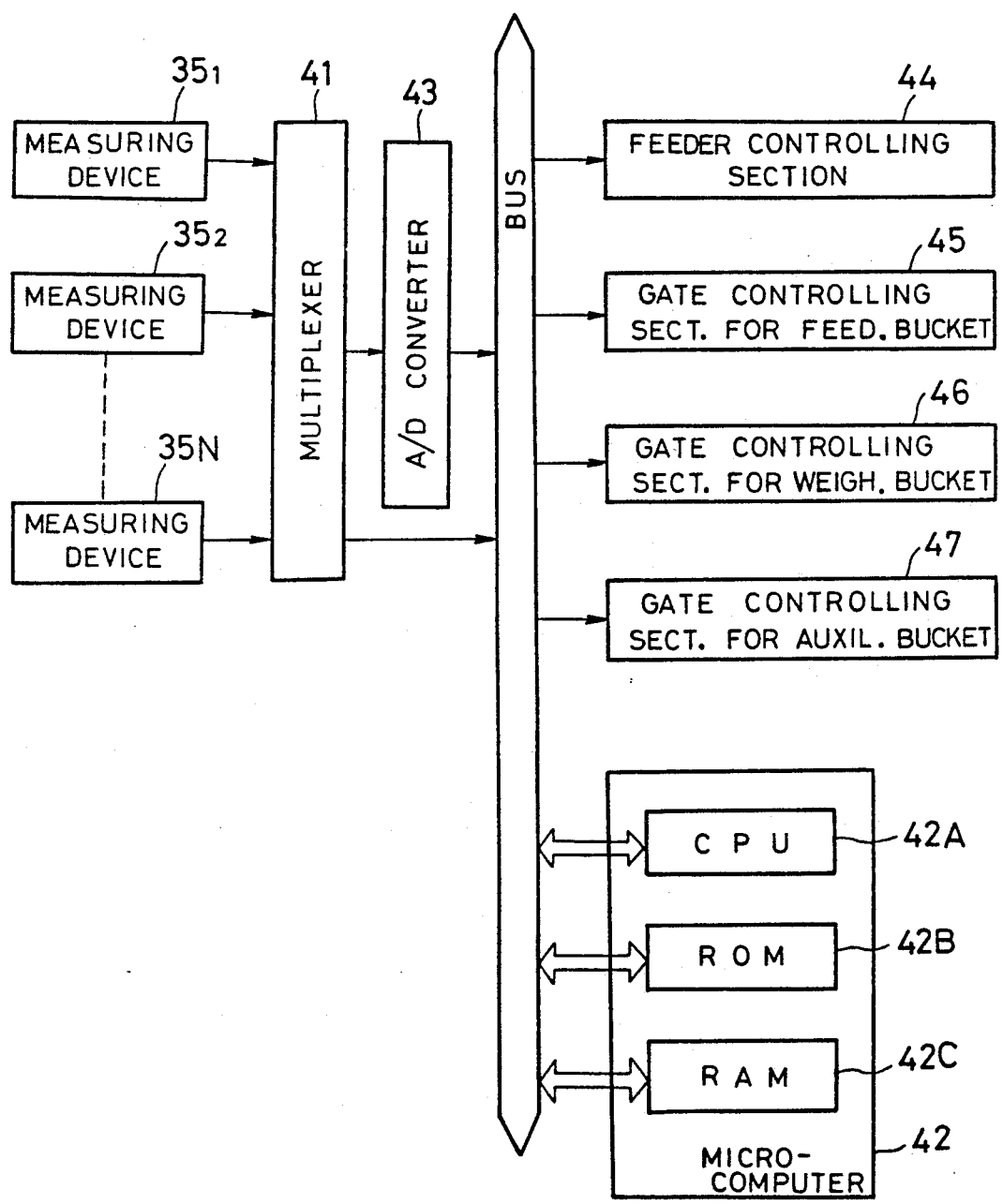

Now, reference is made to FIG. 4 showing a control mechanism for the combination weighing apparatus of the first embodiment. A multiplexer 41 shown therein is adapted to receive analog weight data which are produced by weighing the masses by means of the measuring devices $35_1$ to $35_N$. These analog weight data are sequentially converted into digitized weight data by an analog-to-digital converter 43, under control of a microcomputer 42. The microcomputer 42 comprises a central processing unit (CPU) 42A which is adapted to execute given programs. A read-only memory (ROM) 42B in the microcomputer stores the given programs, and a random-access memory (RAM) 42C in said microcomputer 42 is utilized as a working memory necessary to execute said programs and comprises areas for registers allotted to the weight data or other data.

The control mechanism comprises a feeder controlling section 44, a gate controlling section 45 for the feeding buckets, a further gate controlling section 46 for the weighing buckets and a still further gate controlling section 47 for the auxiliary buckets. The above-mentioned programs are executed to give commands to these controlling sections. The feeder controlling section 44 controls the feeders $31_1$ to $31_N$ to deliver the masses of material to the feeding buckets $32_1$ to $32_N$. The gate controlling section 45 opens or closes the outlet gates $34_1$ to $34_N$ to control delivery of said masses to the weighing buckets $33_1$ to $33_N$ from the feeding buckets $32_1$ to $32_N$. The further gate controlling section 46 opens or closes the pair of outlet gates $38_1$ to $38_N$ so as to control transfer of said masses to the auxiliary buckets $36_1$ to $36_N$ or discharge of said masses directly to the collecting chute 37. The still further gate controlling section 47 opens or closes the outlet gates $39_1$ to $39_N$ to control discharge of the said masses to the chute 37 from the auxiliary buckets $36_1$ to $36_N$.

Commands are given by the microcomputer 42 to these controlling sections 44 to 47 so that the feeders $31_1$ to $31_N$, the outlet gates $34_1$ to $34_N$, $38_1$ to $38_N$ and $39_1$ to $39_N$ are controlled to supply the chute 37 with a batch of the masses which are selected by the combination processing, the batch being of a predetermined weight and being subsequently packed by the packing device.

Figure 5:
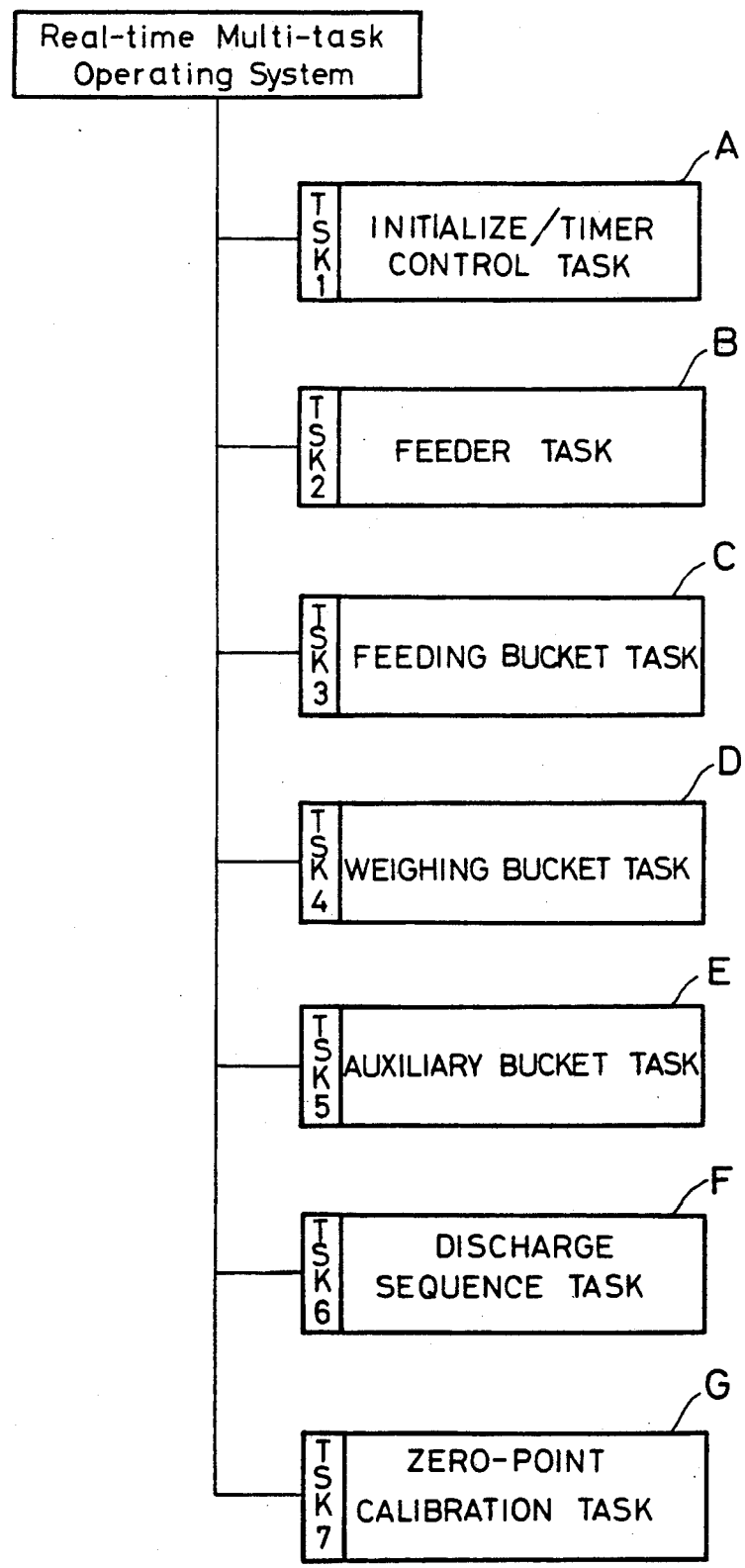

The ROM 42B of the microcomputer stores a Real-time Multitask Operating System which is shown in FIG. 5 and comprises an initialize/timer-control task "TSK1", a feeder task "TSK2", a feeding bucket task "TSK3", a weighing bucket task "TSK4", an auxiliary bucket task "TSK5", a discharge sequence task "TSK6" and a zero-point calibration task "TSK7", respectively labeled "A", "B", "C", "D", "E", "F" and "G" in FIG. 5.

The initialize/timer-control task "TSK1" ("A") is adapted to initialize, and set initial values to, the registers or the like allotted in the RAM 42C. Further, this task "TSK1" controls the measuring of time elapsed during the execution of the programs.

The other tasks "TSK2" to "TSK7" (i.e., "B" to "G") will be described in detail referring to flowcharts shown in FIGS. 7 to 12 and a time chart shown in FIG. 6. For ease of description, only one feeder $31_1$, the feeding bucket, $32_1$, weighing bucket $33_1$, and auxiliary bucket $36_1$ are described although there are "N" sets of these feeders and buckets in the weighing apparatus in this first embodiment.

I. Feeder Task "TSK2" (shown in FIG. 7 and labeled "B" in FIG. 5)

Step C-5 in the feeding bucket task "TSK3" described below causes this feeder task "TSK2" to start. At Step B-1 of this feeder task "TSK2", the feeder $31_1$ is switched on at time $t_4$, and the feeder will continue to run for an operation period of time determined at Step B-2. The feeder is switched off at time $t_5$ as shown on the time chart, at Step B-3. Then, this feeder task "TSK2" ends at Step B-4.

II. Feeding Bucket Task "TSK3" (shown in FIG. 8 and labeled "C" in FIG. 5)

Step D-14 in the weighing bucket task "TSK4" described below causes this feeding bucket task "TSK3" to start at time $t_3$, shown on the time chart. The outlet gate $34_1$ is opened at Step C-1, and subsequently, the weighing bucket task "TSK4" ("D") is started at Step C-2. Step C-3 maintains the outlet gate $34_1$ open for a period of time sufficient to completely transfer the mass in the feeding bucket $32_1$ to the corresponding weighing bucket $33_1$. Thereafter, the outlet gate $34_1$ is closed at time $t_4$ shown on the time chart, at Step C-4. Step C-5 causes the feeder task "TSK2" "B" to start. Finally, this feeding bucket task "TSK3" ends at Step C-6.

III. Weighing Bucket Task "TSK4" (shown in FIGS. 9a and 9b, and labeled "D" in FIG. 5)

Step C-2 in the feeding bucket task "TSK3" described above causes this weighing bucket task "TSK4" to start, which comprises Step D-1 for setting a weight signal-stabilizing period of time "$T_w$" on a timer "TM1$_1$" (tm1$_1$). Step D-2 of this task determines a period of time to stabilize the weight data that is obtained in respect of the mass in the weighing bucket $33_1$ by means of the measuring device $35_1$. The weight data is read at Step D-3, and a weighing end flag is set at Step D-4.

A decision is made at Step D-5 as to whether or not the auxiliary bucket $36_1$ which has to receive the weighed mass from the weighing bucket $33_1$ is empty. If not, then a further decision, is made at Step D-6 on whether or is not there is a discharge command for this weighing bucket $33_1$, the command being transmitted at Step F-8 of the discharge sequence task "TSK6" described hereinafter. If there is no discharge command at Step D-6, then the current process returns to Step D-5 after a pause for 10 (ten) milliseconds at Step D-7.

If Step D-5 it is decided that the auxiliary bucket $36_1$ is empty then the outlet (transfer) gate $38_1$ is opened at Step D-8 so as to transfer the weighed mass in the weighing bucket $33_1$ to said auxiliary bucket $36_1$. Then, an event signal indicating the opening of the transfer gate $38_1$ is transmitted at Step D-9. The weighing end flag is reset and a transfer end flag is set at Step D-10. Thereafter, Step D-11 causes the transfer gate $38_1$ to remain opened for such a period of time T1 that is necessary for the mass in the weighing bucket $33_1$ to be completely transferred to the auxiliary bucket $36_1$. Said transfer gate $38_1$ will be closed at time $t_3$ which is shown on in the time chart, at Step D-12.

Figure 9A:
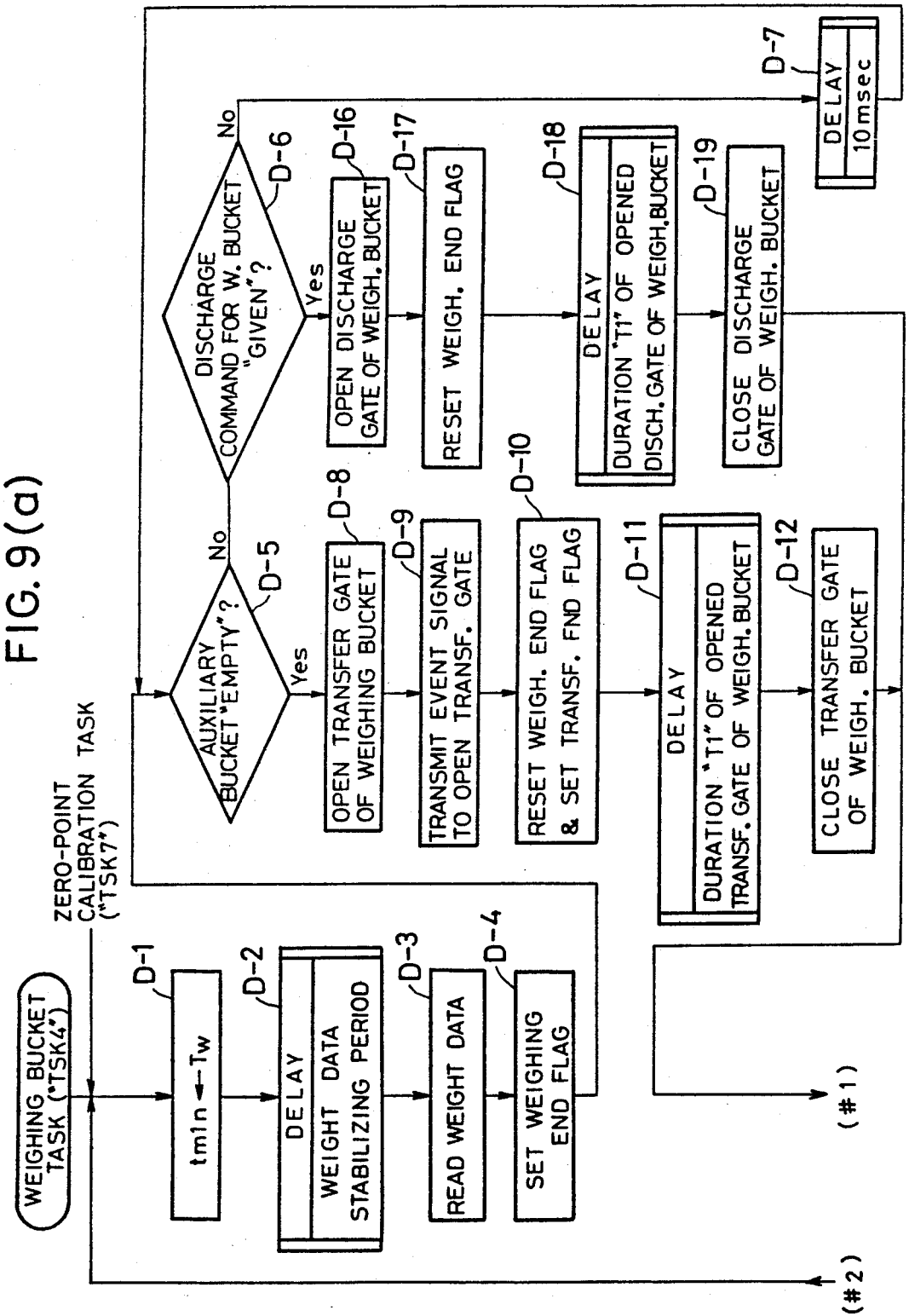
Figure 9B:
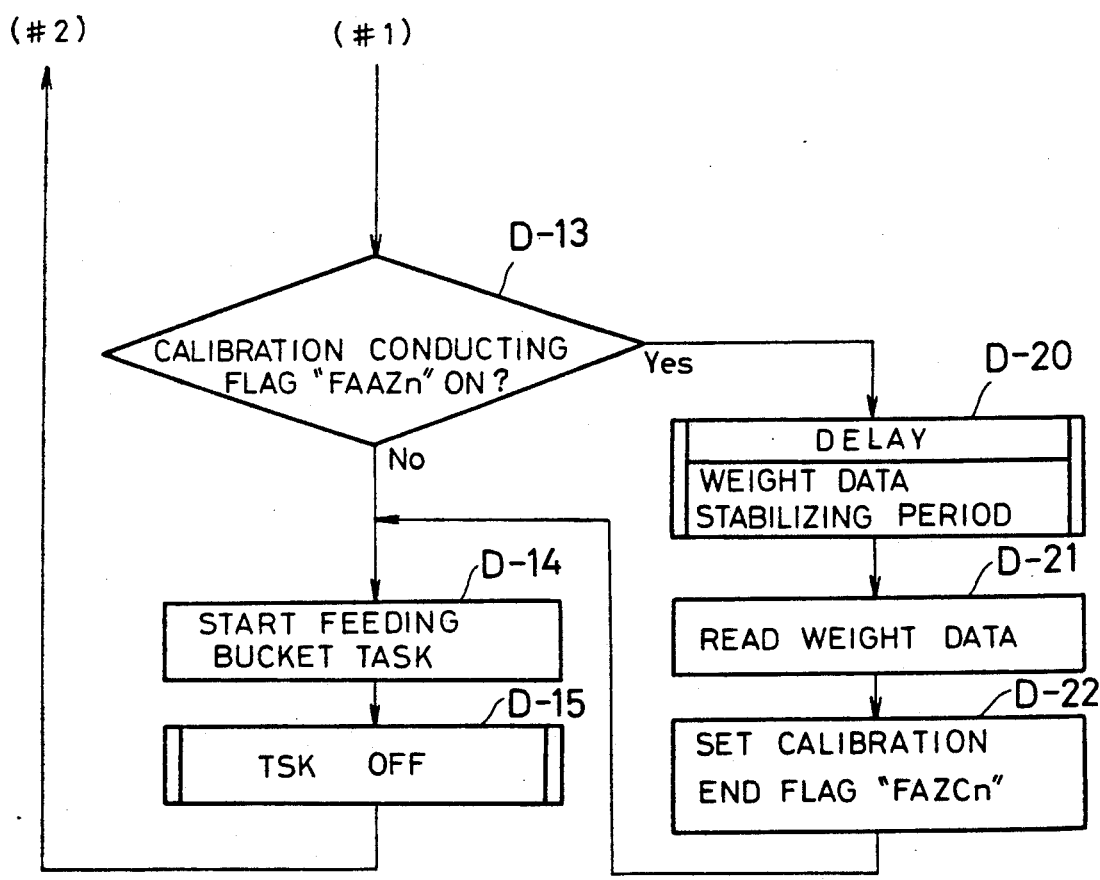
Figure 11:
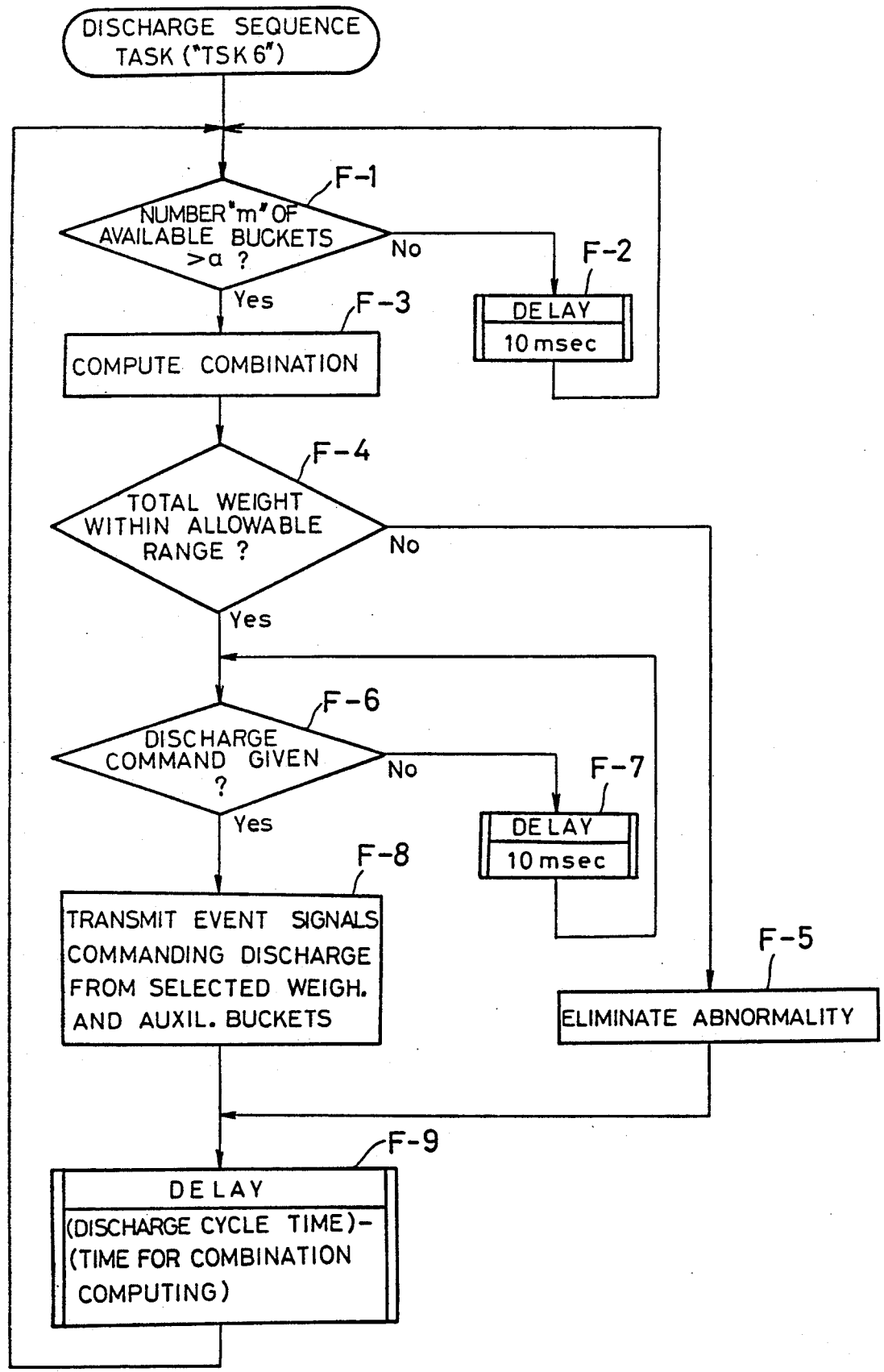

Subsequently, a still further decision is made at Step D-13 shown in FIG. 9b as to whether or not a calibration conducting flag "FAAZ$_1$" indicating that a zero-point calibration of the weighing bucket $33_1$ is to be executed in this task "TSK4"("D") is set to be "ON". If not, then the feeding bucket task "TSK3" ("C") is caused to start, and thereafter, this weighing bucket task "TSK4" is caused to end by Step D-15.

On the other hand, if it is decided at Step D-6 that the event of discharge command is present, then the outlet (discharge) gate $38_1$ is opened at time $t_5$ at Step D-16. The opening of this gate $38_1$ permits the mass in the weighing bucket $33_1$ to enter the collecting chute 37. The weighing end flag is reset at Step D-17, and the discharge gate $38_1$ is maintained open for the period of time T1 at Step D-18) which is the same period as that referred to at Step D-11 (and is sufficient to completely discharge the mass in said weighing bucket $33_1$. After this period T1 has elapsed, the discharge gate $38_1$ is closed at Step D-19.

If the calibration conducting fag "FAAZ$_1$" is found to be "ON" at Step D-13, then a period long enough to stabilize a weight signal obtained by the "blank" weighing of said weighing bucket $33_1$, i.e., a tare weight thereof measured by the measuring device $35_1$, is allowed to elapse at Step D-20. Thereafter, the tare weight is read at Step D-21 before a calibration end flag "FAZC$_1$" is set indicating a finish of zero-point calibration at Step D-22.

IV. Auxiliary Bucket Task "TSK5" ( shown in FIG. 10 and labeled "E" in FIG. 5 )

At Step E-1, a decision is made as to whether or not there is an event signal to open the transfer gate $38_1$, the event signal being transmitted at Step D-9 of the weighing bucket task "TSK4". If not, then the process returns to Step E-1 after a pause for 10 (ten) milliseconds at Step E-2. If there is an event signal, then the transfer end flag is reset at Step E-3 at time $t_1$ shown on the time chart. Next, the outlet gate $39_1$ of the auxiliary bucket $36_1$ is opened at Step E-4 to discharge the mass therein into the chute 37. The open state of said gate $39_1$ is maintained for a period of time T3 at Step E-5, the period T3 being the ordinary length of time for the mass which has been completely transferred from the weighing bucket $33_1$ to be subsequently discharged thoroughly from the auxiliary bucket $36_1$. When the period T3 is over, the outlet gate $39_1$ is closed at Step E-6 and the process returns to Step E-1.

V. Discharge Sequence Task "TSK6" (shown in FIG. 11 and labeled "F" in FIG. 5 )

At Step F-1, a first decision is made on whether or not a total number "m" of the buckets subject to selection in the combination processing, including the weighing buckets $33_1$ to $33_N$, and the auxiliary buckets $36_1$ to $36_N$ is higher than a predetermined number "a", the former buckets having the weighing end flag and the latter buckets having the transfer end flag. If not, then the process returns to Step F-1 after a pause for 10 (ten) milliseconds at Step F-2. If so, a combination is computed at Step F-3 to select adequate masses or buckets among those subject to selection. Subsequently at Step F-4, a second decision is made on whether or not the selected masses in the selected buckets amount to a total weight which falls within an allowable range of weight. If not, a processing to eliminate such an abnormality is done at Step F-5, and the process advances to Step F-9 described below. If yes, then a third decisions is made at Step F-6 as to whether or not there is a command to discharge said selected masses, which command will be previously given by, for instance, the packing device. If not at this third decision, at Step F-6 the process returns to Step F-6 after a pause for 10 (ten) milliseconds at Step F-7.

If, on the contrary, a discharge command is found at Step F-6, then an event signal is transmitted at Step F-8 at time $t_4$ to discharge the selected masses in selected buckets to the chute. A pause is made at Step F-9 for a period of time which is determined by subtracting a time length "TC" for computing combination from a discharge cycle time (i.e., weighing cycle time) "TD" before the process returns to step F-1.

VI. Zero-Point Calibration Task "TSK7" ( shown in FIG. 12 and labeled "G" in FIG. 5 )

This zero-point calibration task "TSK7" transmits a command signal at given regular intervals sequentially for the weighing buckets $33_1$ to $33_N$ so as to cause the weighing bucket task "TSK4" to actually execute the zero-point calibration of said buckets.

Figure 6:
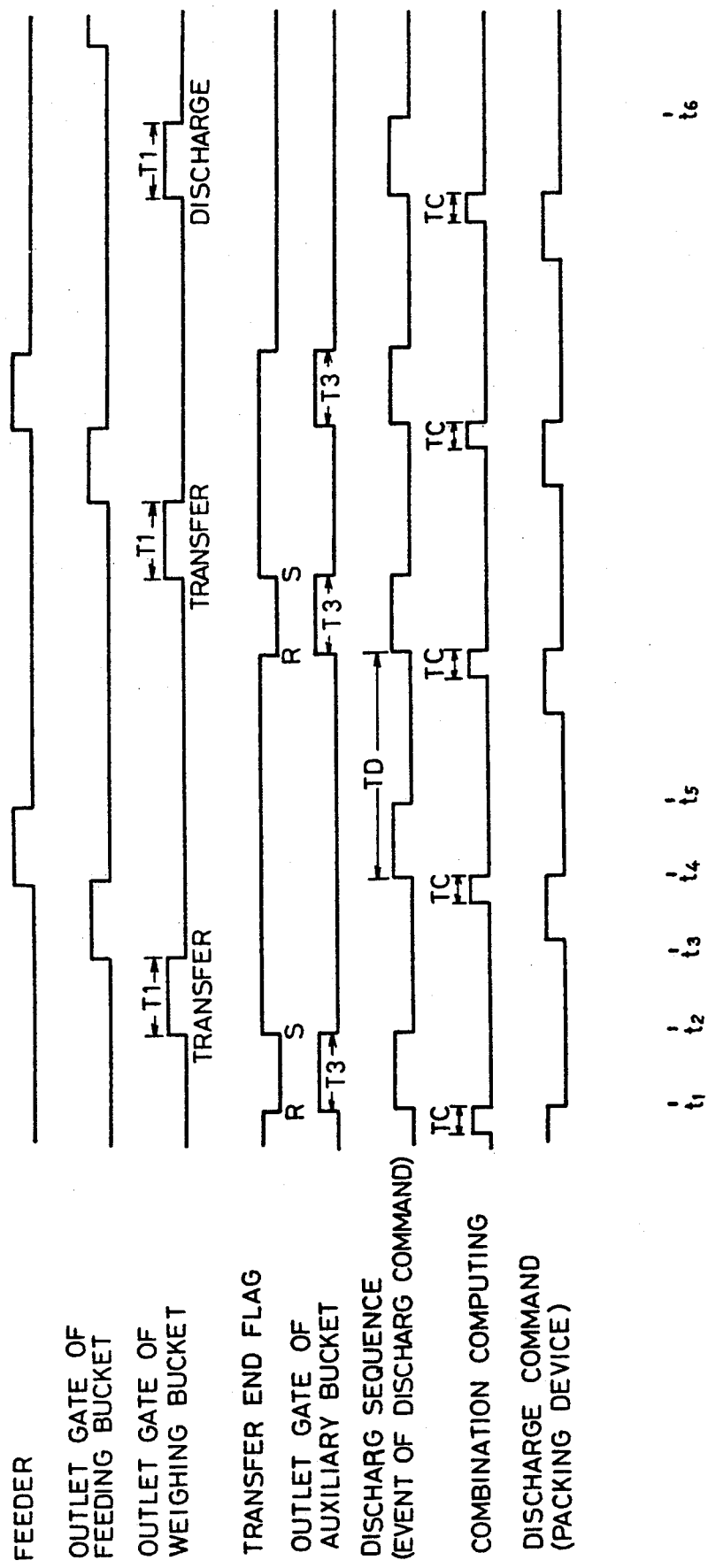
Figure 7:
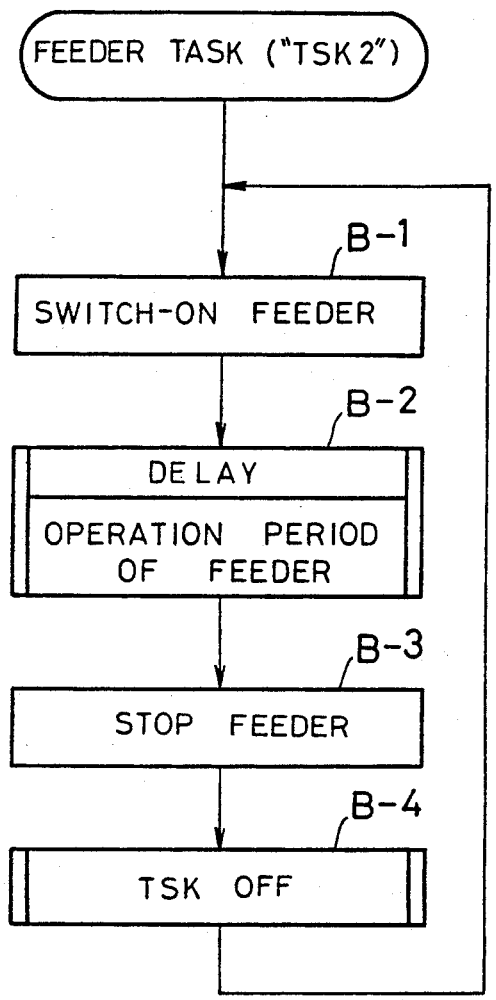
Figure 8:
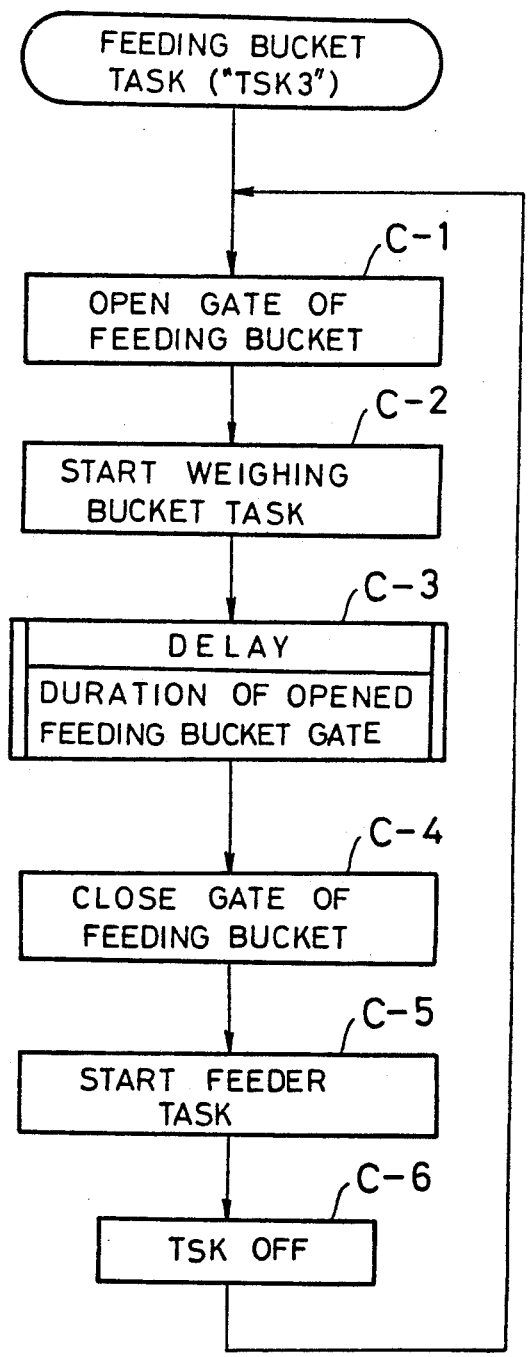
Figure 13:
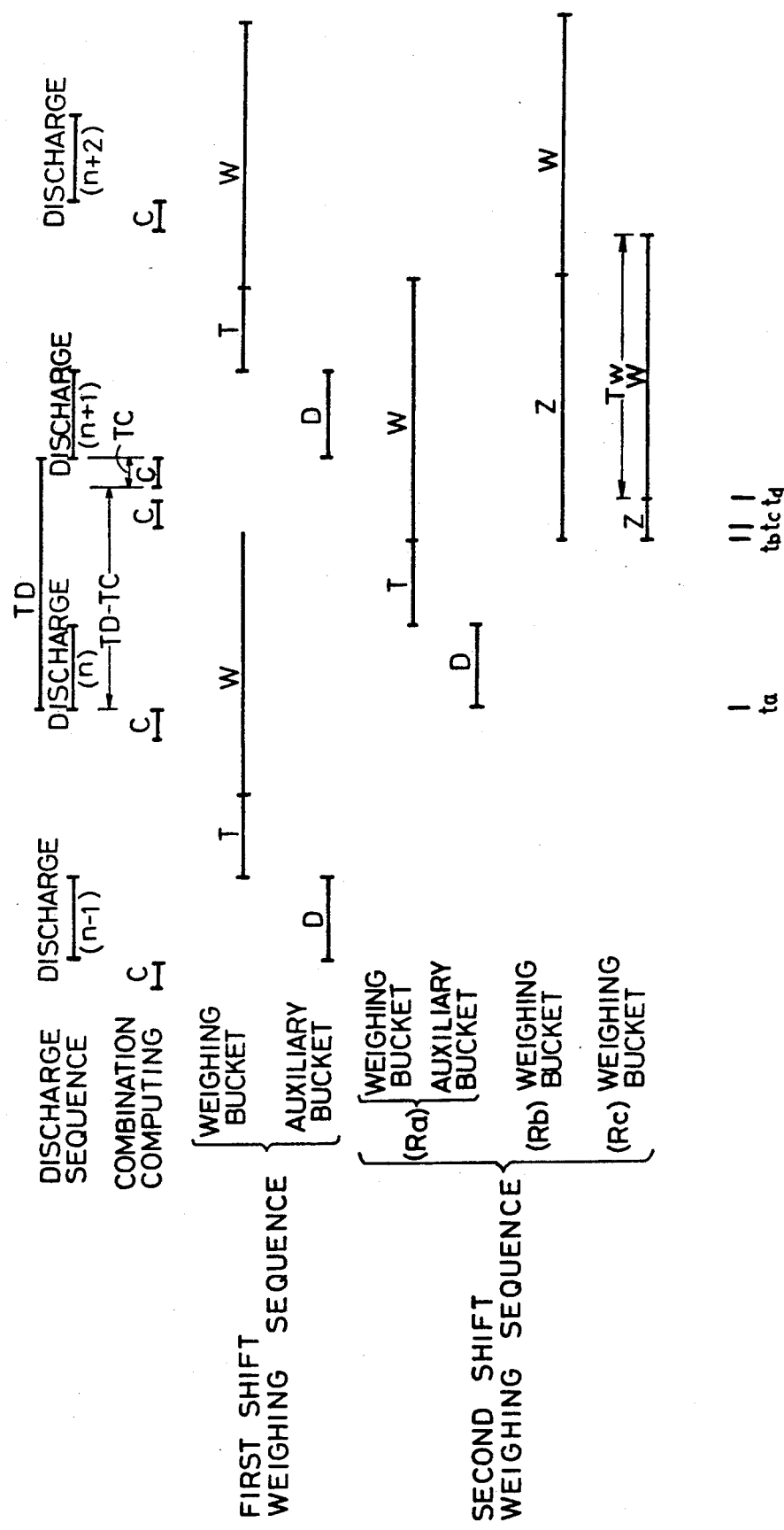

In addition to the time chart shown in FIG. 6, another time chart shown in FIG. 13 also is referred to here, in which an exemplified operation of the task "TSK7" is clearly disclosed. A reference symbol "C" on the horizontal bars in FIG. 13 denotes a period of time needed to calculate possible combinations, each combination including weighed masses of material contained in the weighing buckets $33_1$ to $33_N$ and/or the auxiliary buckets $36_1$ to $36_N$. Another reference symbol "D" denotes a period of time required to discharge the mass contained in selected bucket(s) $33_1$ to $33_N$ and/or $36_1$ to $36_N$ into the collecting chute 37. A still another reference symbol "T" indicates a length of time necessary for the mass in the weighing buckets $33_1$ to $33_N$ to be transferred to the auxiliary buckets $36_1$ to $36_N$. A further reference symbol "W" indicates a further period of time for the "actual" weighing of said weighing buckets which is done to determine the weight of said mass contained in said weighing buckets $33_1$ to $33_N$. A still further reference symbol "Z" indicates a still further period of time for the "blank" weighing of empty weighing buckets which is done to calibrate the zero-point of said weighing bucket $33_1$ to $33_N$.

A group "Ra" of the horizontal bars in FIG. 13 indicate a case wherein no calibration of zero point is conducted during the second shift of weighing sequence The weighing of a succeeding mass begins as shown by "W" immediately after a preceding mass has been transferred as shown by "T" to the auxiliary buckets $36_1$ to $36_N$, in this mode. Another group "Rb" of the horizontal bars in FIG. 13 indicate another case wherein calibration of zero point is conducted at regular intervals of time or after a predetermined number of discharges or transfers of the masses out of the weighing buckets $33_1$ to $33_N$, during the second shift of weighing sequence. In the example illustrated in FIG. 13, the feeding buckets $32_1$ to $32_N$ do not supply the weighing buckets $33_1$ to $33_N$ with and succeeding masses after the latter buckets have discharged or transferred as shown by the symbol "D" or "T" their contents in the n-th cycle. Thus, "blank" weighing of said weighing buckets is carried out as shown by "Z" immediately after finish of the discharge or transfer. Weight signals obtained by such blank weighing will be transmitted as tare weights of said weighing buckets, after signals of the tare weights have become stable.

The "actual" weighing "W" will be reopened by the weighing buckets $33_1$ to $33_N$ to which succeeding masses of material will be fed from the feeding buckets $32_1$ to $32_N$, after the "blank" weighing "Z" has completed. It is however impossible for the weighing buckets to finish the reopened "actual" weighing of the succeeding masses before the calculation of combination for (n+2)th discharge cycle starts. Thus, the succeeding masses cannot be made subject to said calculation for the (n+2)th discharge.

Figure 12B:
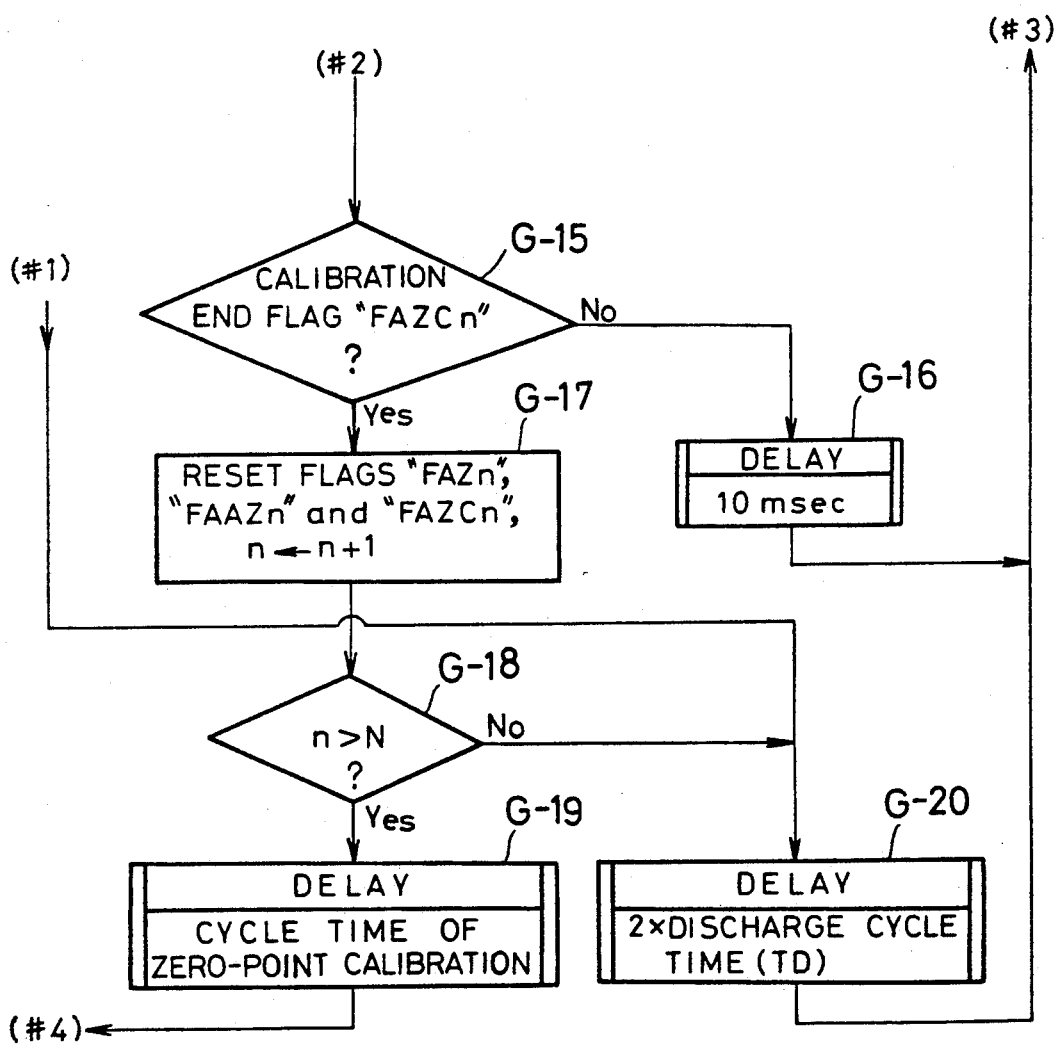

A still another group "Rc" of the horizontal bars in FIG. 13 is related to the zero-point calibration task "TSK7" in the embodiment, which task will now be described referring to a program shown in FIG. 12. At Step G-1, an ordinal number "n" representing the weighing buckets $33_1$ to $33_N$ is set to be "1", as an initial setting. A zero-point calibration flag "$FAZ_n$" is set to be "ON" at Step G-2 before the calibration conducting flag "$FAAZ_n$" is set at Step G-3. It is to be noted that the zero-point calibration flag "$FAZ_n$" merely indicates the necessity of calibration as to the weighing buckets $33_1$ to $33_N$ whereas the calibration conducting flag "$FAAZ_n$" gives a command to the weighing bucket task "TSK4" to execute the zero-point calibration of said weighing buckets $33_1$ to $33_N$.

At Step G-4, a decision is made as to whether or not there is a discharge command which is transmitted at Step F-8 of the discharge sequence task "TSK6" with respect to the weighing bucket $33_n$ (n−1 to N). If not, then the process skips to Step G-15. If there is a discharge command at time $t_a$, then the process advances to the next Step G-5. At this Step G-5, a discharge period of time "tm2" is set on a timer "TM2", "tm2" being a remainder of the discharge cycle time (i.e., weighing cycle time) "TD" from which subtracted is the time length "TC" needed to compute the possible combinations.

At Step G-6 a decision is made as to whether or not a residual length of time "$tm1_p$" which is indicated by timer "$TM1_p$" to be necessary for each of said weighing bucket $33_1$ to $33_N$ to finish the weighing is more than "0" but less than the residual period of time "tm2" indicated by the timer "TM2". If this decision is yes, then a flag "$FW_p$" is set to indicate a fact that the total number "m" of the effective buckets subject to selection will be increased. If no, then the flag "$FW_p$" is reset to indicate the contrary fact that said total number "m" will not be increased, before the process advances to Step G-7.

At Step G-7, a further decision is made on whether or not all of the flags "$FW_1$" to "$FW_N$" have been reset. This decision is made to determine if the total number of the buckets which will become subject to the next computing of combinations will increase by the time of the next computing. In other words, whether or not the total number "m" of said effective buckets has already become fixed is decided at this Step G-7. If said number "m" is found to be already fixed at a timing $t_b$, then executed at Step G-8 is the computing of possible combinations of the buckets which can discharge their contents at the next discharge cycle.

A still further decision is made at time $t_d$ at Step G-9, based on the possible combinations computed at Step G-8, as to whether or not the predicted total number of buckets that will be used in the next cycle (i.e., the n+1 cycle) is greater than a standard number, for example 4. If this predicted number of buckets is greater than the standard number, then the number of buckets available in the cycle after the next cycle (i.e., the n+2 cycle) may be undesirably low, and it may be desirable to inhibit zero-point calibrations so that more of the buckets from the current cycle (i.e., the n cycle) will be available in the cycle after the next cycle, i.e., the n+2 cycle. Thus, the decision at Step G-9 is made to determine whether any buckets used in the current cycle (n) will be needed in the cycle after the next cycle (n+2). Another way of looking at the decision at Step G-9 is to decide whether the number of buckets available for the cycle after the next cycle (n+2) exceeds a certain number.

If the decision at Step G-9 is "no", i.e., the predicted number of buckets that will be used in the next cycle (n+1) does not exceed the standard number, then there will be an adequate number of buckets for the cycle after the next cycle (the n+2 cycle). The process skips to Step G-15 and zero point calibration continues.

If the decision at Step G-9 is "yes", i.e., the predicted number of buckets that will be used in the next cycle (the n+1 cycle) exceeds the standard number, then there may not be an adequate number of buckets for the cycle after the next cycle (the n+2 cycle). The process advances to Step G-10 where a further decision is made on whether or not the weighing buckets $33_n$ has already commenced zero point calibration. If the decision at Step G-10 is "no", i.e., zero-point calibration has not commenced, then the calibration conducting flag "FAAZn" is rest at Step G-11, and the process skips to Step G-15, inhibiting any new zero-point calibrations in the weighing bucket tasks "TSK4".

If the decision at Step G-10 is "yes", i.e., zero-point calibration has commenced, then a further decision is made at Step G-12 in order to determine whether or not there is sufficient time to terminate zero-calibration so that the bucket $33_n$ will be available for the cycle after the next cycle (n+2). In particular, the decision is made at Step G-12 on whether or not the weight signal stabilization period Tw is greater than the sum of tm2 and TD, tm2 being the remainder of the current cycle time (n) and TD representing the normal period, i.e., the period for the next cycle (the n+1 cycle). The sum represents the time remaining before cycle n+2 begins. If Tw is greater than the sum tm2+TD, then the bucket $33_n$ would not be available for the cycle after next cycle, i.e., the n+2 cycle, and the process skips to Step G-15 and zero-point calibration continues. If Tw is less than the sum Tm2+TD, then the bucket $33_n$ would be available for the cycle after the next cycle, i.e., cycle n+2, and the process advances to Step G-13 to forcibly terminate zero-point calibration and start the weighing bucket task "TSK4" from Step D-1.

As a result, the weighing bucket $33_n$ which is being to be "blank"-weighed at this instant is switched over to conduct the "actual" weighing. Subsequently, the calibration conducting flag "$FAAZ_n$" is reset at Step G-14 before the process advances to Step G-20.

At Step G-15 to which reference has been made several times hereinbefore, a decision is made as to whether or not the zero-point calibration is finished, that is, whether or not the calibration end flag "$FAZC_n$" is set. If not, then the process returns to Step G-2 after a pause for ten (10) milliseconds at Step G-16. On the contrary, if yes at said decision, then the zero-point calibration flag "$FAZ_n$", the calibration conducting flag "$FAAZ_n$" and the calibration end flag "$FAZC_n$" are reset and at the same time "1" is added to "n" at Step G-17. Then, the current number "n" is judged to be or not to be higher than the total number "N" of the weighing buckets $33_1$ to $33_N$. That is, a decision is made at Step G-18 on whether all of the weighing buckets have undergone the zero-point calibration. If yes, then a pause is made at Step G-19 for a zero-point calibration cycle time until the next calibration cycle starts, before the process returns to Step G-1. However, in a case wherein the current cycle of calibration has not yet completed for the weighing bucket carrying the greatest number "N", the process makes a pause for a period of time which is two times the discharge cycle time "TD" and thereafter returns to Step G-2.

It will be understood that the present invention can also be applied to such an apparatus as composed of receptacle sets each comprising one feeding bucket and one weighing bucket as in the basic set referred to above, or to such an apparatus which comprises two auxiliary buckets for one weighing bucket or which comprises two weighing buckets, respectively for one feeding bucket, although the apparatus in the embodiment has the bucket sets each comprising one weighing bucket and one auxiliary bucket.

Figure 15:
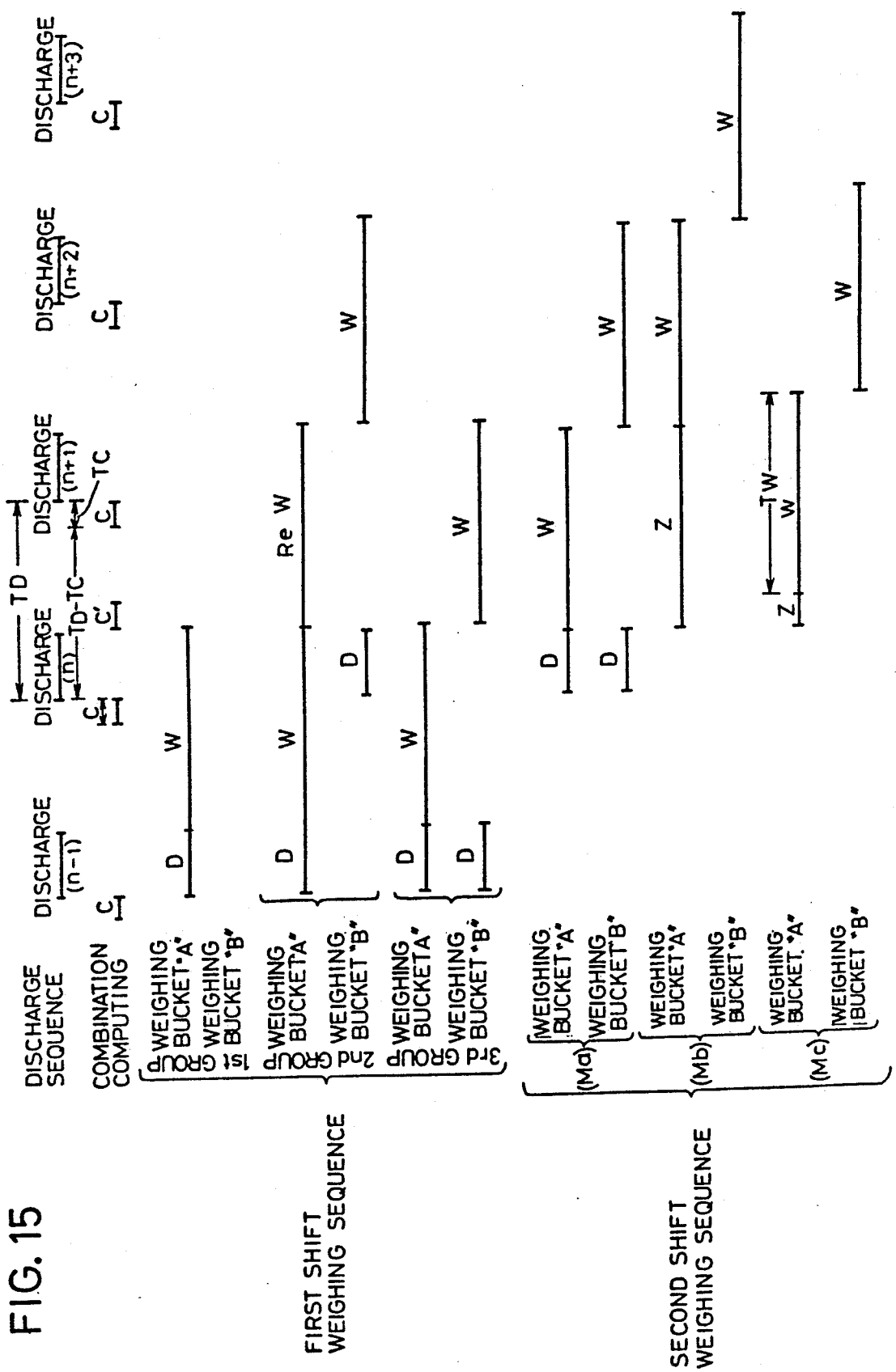
Figure 17:
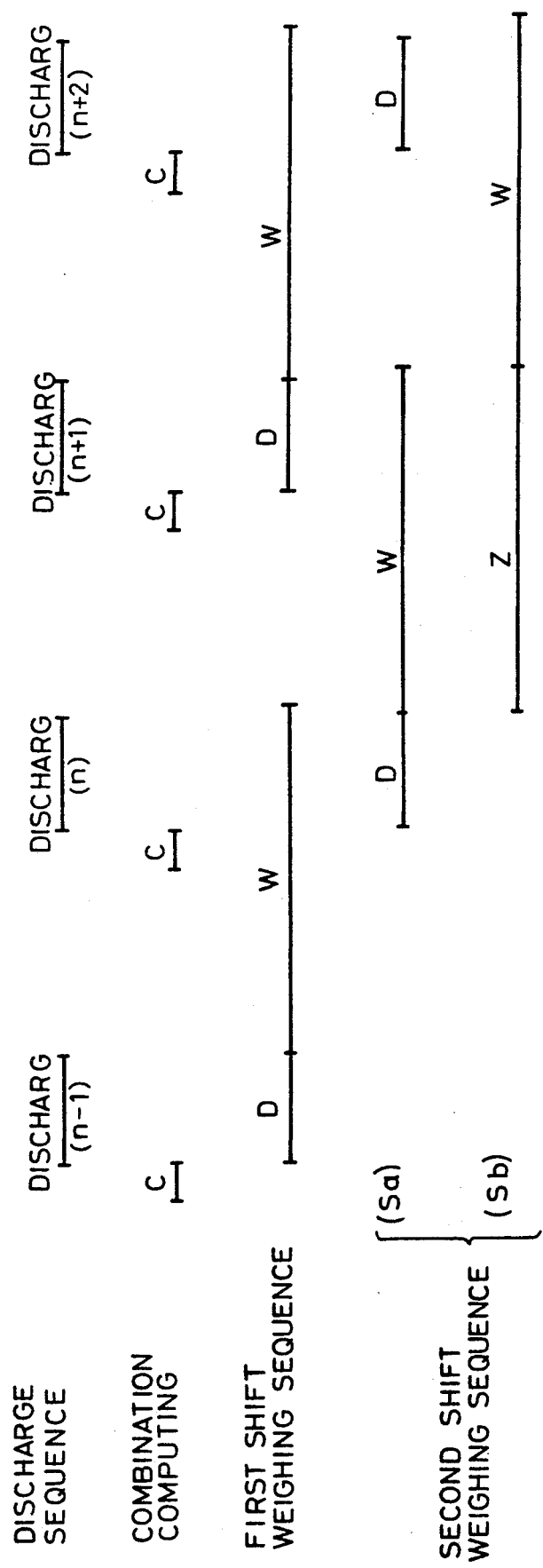

Further, the time chart given in FIG. 15 is for an apparatus which has bucket sets each comprising two weighing buckets "A" and "B". The time chart in FIG. 15 corresponds to that shown in FIG. 13, but illustrates 1st to 3rd groups for the first shift weighing sequence and groups Ma, Mb and Mc of horizontal bars in the second shift weighing sequence. The reference symbol "Re-W" denotes a repeated weighing conducted by the weighing bucket "A" immediately after the discharge from the other weighing bucket "B". The invention may be applied also to such "triple-shift" operation comprising first to third weighing sequences as is disclosed in the Japanese Patent Publication Kokai 61-104230.

What is claimed is:

1. A zero-point calibration system in a combination weighing apparatus having buckets storing processing, the system comprising:
   (a) detecting means (1) for detecting when a number of buckets available in the next cycle becomes definite;
   (b) combination computing means, responsive to the detecting means (2) for calculating the number of the buckets from which the masses are discharged in the next cycle of combination processing, by computing possible combinations of the buckets to be selected in the selection;
   (c) predictive computing means (3) for effecting a predictive calculation of a further number of the buckets which would be available in the selection in the cycle after the next cycle of combination processing, based on the number of buckets calculated by the combination computing means (2); and
   (d) zero-point calibrating means for blank weighing a selected one or more of the buckets;
   (e) rearranging means (4) for changing states of one or more of the selected buckets from their inactive states for blank weighing in zero-point calibration into their operative states for the actual weighing of the masses which are subject to the selection in the cycle after the next cycle of combination processing, when the further number is less than a predetermined number whereby the number of the buckets available to said cycle after the next cycle of combination processing is increased in a case wherein the further number predictively calculated by the predictive computing means is less than the predetermined number.

2. A zero-point calibration system as set forth in claim 1 wherein the buckets storing masses subject to selection in the combination processing are only weighing buckets.

3. A zero-point calibration system as set forth in claim 1 wherein the buckets storing masses subject to selection in the combination processing are weighing buckets an auxiliary buckets.

4. A zero-point calibration system as set forth in claim 1 wherein the buckets storing masses subject to selection in the combination processing are only auxiliary buckets.

5. A zero-point calibration system for a combination weighing apparatus having buckets storing masses subject to selection in each cycle of combination processing of the apparatus, said system comprising:
   zero-point calibrating means for blank weighing a selected bucket during a first cycle;
   combination computing means for computing a number of buckets to be used during a second cycle following the first cycle;
   predicting means for predicting, based on the number computed by the combination computing means, a predicted number of buckets to be available during a third cycle following the second cycle; and
   inhibiting means for inhibiting the zero-point calibrating means in the event that the predicted number is less than a predetermined minimum.

* * * * *

UNITED STATES PATENT AND TRADEMARK OFFICE
CERTIFICATE OF CORRECTION

PATENT NO. : 5,069,300

DATED : December 3, 1991

INVENTOR(S) : Yoshiharu Toyoda

It is certified that error appears in the above-identified patent and that said Letters Patent is hereby corrected as shown below:

Column 11, claim 1, lines 40-41, "storing processing, the" should read ---storing masses subject to selection in each cycle of combination processing, the---.

Column 12, claim 3, lines 28-29, "buckets an" should read ---buckets and---.

Signed and Sealed this

Twenty-seventh Day of April, 1993

Attest:

MICHAEL K. KIRK

*Attesting Officer*   Acting Commissioner of Patents and Trademarks